(12) United States Patent
Takeuchi

(10) Patent No.: US 7,254,181 B2
(45) Date of Patent: Aug. 7, 2007

(54) TRANSMITTING APPARATUS AND METHOD, RECEIVING APPARATUS AND METHOD, AND TRANSMITTING AND RECEIVING APPARATUS AND METHOD

(75) Inventor: Isao Takeuchi, Tokyo (JP)

(73) Assignee: Sony Corporation (JP)

( * ) Notice: Subject to any disclaimer, the term of this patent is extended or adjusted under 35 U.S.C. 154(b) by 699 days.

(21) Appl. No.: 10/067,384

(22) Filed: Feb. 5, 2002

(65) Prior Publication Data

US 2002/0122500 A1 Sep. 5, 2002

(30) Foreign Application Priority Data

Feb. 7, 2001 (JP) .............. P2001-030964

(51) Int. Cl.
*H04L 5/12* (2006.01)

(52) U.S. Cl. ............... 375/261; 375/298; 375/316

(58) Field of Classification Search ............ 375/146, 375/141, 130, 229, 343, 225, 281, 284, 295, 375/298, 261, 316, 232; 370/332; 455/13.4, 455/38.3, 67.3, 69, 226.3
See application file for complete search history.

(56) References Cited

U.S. PATENT DOCUMENTS

| | | | | |
|---|---|---|---|---|
| 4,669,091 A | * | 5/1987 | Nossen | 375/232 |
| 6,031,866 A | * | 2/2000 | Oler et al. | 375/219 |
| 6,222,878 B1 | * | 4/2001 | McCallister et al. | 375/225 |
| 6,246,715 B1 | * | 6/2001 | Park et al. | 375/146 |
| 6,693,951 B1 | * | 2/2004 | Gilhousen et al. | 375/130 |
| 6,693,953 B2 | * | 2/2004 | Cox et al. | 375/141 |
| 6,741,643 B1 | * | 5/2004 | McGibney | 375/229 |
| 6,879,630 B2 | * | 4/2005 | Kokuryo et al. | 375/231 |
| 2002/0067783 A1 | * | 6/2002 | Sung | 375/343 |
| 2002/0118728 A1 | * | 8/2002 | Mohseni et al. | 375/146 |

OTHER PUBLICATIONS

Propagation considerations for the design of an indoor broad-band communications system at EHF Bultitude, R.J.C.; et al.; Vehicular Technology, IEEE Transactions on vol. 47, Issue 1, Feb. 1998 pp. 235-245.*

Interference-robust serial dual-path threshold referenced architecture for PN acquisition Deng, C.; Chien C.; Global Telecommunications Conference, 1998. GLOBECOM 98. The Bridge to Global Integration. IEEE vol. 5, Nov. 8-12, 1998 pp. 2756-2761 vol.*

* cited by examiner

*Primary Examiner*—Temesghen Ghebretinsae
(74) *Attorney, Agent, or Firm*—Lerner, David, Littenberg, Krumholz & Mentlik, LLP

(57) ABSTRACT

A transmitter transmits a quadrature modulated signal including transmission data as an I component and a known PN sequence as a Q component. The signal is received by a receiver which separates the signal into a real part and an imaginary part, and then is supplied to an equalizer and also to an I correlation circuit and a Q correlation circuit. In the meantime, a PN sequence identical with the PN sequence of the transmitter is generated by a generator, and then supplied to the I correlation circuit and the Q correlation circuit. The I correlation circuit and the Q correlation circuit determine a ratio and a time difference between a leakage component of the Q component leaking to an I channel and the Q component formed by a direct wave, and a ratio and a time difference between the Q component formed by an indirect wave and the Q component formed by the direct wave in a Q channel, respectively, on the basis of the real part, the imaginary part, and the PN sequence supplied to the I correlation circuit and the Q correlation circuit. The equalizer adaptively equalizes by the data obtained by the I correlation circuit and the Q correlation circuit.

14 Claims, 5 Drawing Sheets

TRANSMITTING APPARATUS AND METHOD, RECEIVING APPARATUS AND METHOD, AND TRANSMITTING AND RECEIVING APPARATUS AND METHOD

CROSS-REFERENCE TO RELATED APPLICATIONS

The present application claims priority from Japanese application No. P2001-030964 filed Feb. 7, 2001, the disclosure of which is hereby incorporated by reference herein.

BACKGROUND OF THE INVENTION

The present invention relates to an apparatus and a method for transmitting a quadrature modulated signal, and an apparatus and a method for receiving the quadrature modulated signal. More particularly, the present invention relates to an apparatus and a method for transmission, an apparatus and a method for reception, and an apparatus and a method for transmission and reception, all of which enable reliable adaptive equalization on the receiving side in transmission and reception in a millimeter wave band.

Conventionally, there has been technology for wireless LANs (Local Area Networks), which constructs a LAN by communication using radio waves and infrared rays. A wireless LAN uses radio waves in a quasi-microwave band, for example a 2.4 GHz frequency band, to achieve a communication speed of 1 to 2 Mbps. Recently, communication over a wireless LAN using a higher frequency band, for example a 60 GHz band, has been proposed. Use of radio waves in such a millimeter wave band makes it possible to achieve a higher communication speed.

Multipath interference tends to occur in communication using radio waves in such a millimeter wave band. When there is multipath interference, characteristics of a communication channel are changed with time as the receiving side or the transmitting side is moved, for example. In addition, in communication using radio waves in a millimeter wave band, a slight movement of the receiving side and the transmitting side may result in a change in phase. Therefore, an equalizer on the receiving side needs to equalize a signal adaptively.

Conventionally, a training time is provided by time division during communication, and known data is transmitted as a pilot signal during the training time. A coefficient of an equalizer on the receiving side is renewed on the basis of the pilot signal, and after the coefficient converges, the coefficient of the equalizer is fixed to transmit data. According to this method, if a sufficient time period and frequency band for transmitting the pilot signal are not secured, in a case where characteristics of the communication channel are changed with time, adjustment of the coefficient of the equalizer cannot track the changes in the characteristics of the communication channel, thus resulting in degraded characteristics of the equalizer with respect to received radio waves.

On the other hand, a method has been used which renews the coefficient of the equalizer on the basis of known data transmitted during a training time, makes data determination during a tracking time after convergence of the coefficient, and uses the data as known data for adjustment of the coefficient of the equalizer. According to this method, the characteristics of the equalizer with respect to received radio waves are degraded when there is an error in the data determination.

In this case, when an IIR type filter is used for the equalizer, in particular, the characteristics of the equalizer are degraded, and also the equalizer may diverge.

SUMMARY OF THE INVENTION

It is accordingly an object of the present invention to provide an apparatus and a method for transmission, an apparatus and a method for reception, and an apparatus and a method for transmission and reception, all of which enable high-precision adaptive equalization of an equalizer on the receiving side for proper reception of transmitted data in communications using quadrature modulation in a millimeter wave band.

In order to solve the above problems, according to the present invention, there is provided a transmitting apparatus including a first transmitting unit operable to transmit a first signal component of a quadrature modulated signal as a signal in which data desired to be transmitted is modulated; and a second transmitting unit operable to transmit a second signal component of the quadrature modulated signal as a training signal, the second signal component being orthogonal to the first signal component.

Further, according to the present invention, there is provided a transmitting method, including transmitting a first signal component of a quadrature modulated signal as a signal in which data desired to be transmitted is modulated; and transmitting a second signal component of the quadrature modulated signal orthogonal to the first signal component as a training signal.

In addition, according to the present invention, there is provided a receiving apparatus, including a receiving unit operable to receive a signal including first and second signal components of a quadrature modulated signal, the first signal component including a signal in which data desired to be transmitted is modulated, and the second signal component being orthogonal to the first signal component and being transmitted as a training signal; and an equalizer operative to adaptively equalize the first signal component using the training signal.

Still further, according to the present invention, there is provided a signal receiving method, including receiving a signal including first and second signal components of a quadrature modulated signal, the first signal component including a signal in which data desired to be transmitted is modulated, and the second signal component being orthogonal to the first signal component and being transmitted as a training signal; and adaptively equalizing the first signal component using the training signal.

Furthermore, according to the present invention, there is provided a transmitting and receiving apparatus for transmitting and receiving a signal modulated by quadrature modulation, the transmitting and receiving apparatus including a transmitting unit operable to transmit a transmission signal including a first signal component of a quadrature modulated signal as a signal in which data desired to be transmitted is modulated, and a second signal component of the quadrature modulated signal as a training signal, the second signal component being orthogonal to the first signal component; and a receiving unit operable to receive the transmission signal and to adaptively equalize the first signal component using the training signal.

According to the present invention, there is further provided a method for transmitting and receiving a signal modulated by quadrature modulation, the method including transmitting a transmission signal including a first signal component of a quadrature modulated signal as a signal in which data desired to be transmitted is modulated and a second signal component of the quadrature modulated signal orthogonal to the first signal component as a training signal; and receiving the transmission signal and adaptively equalizing the first signal component using the training signal.

According to the present invention, the first signal component of the quadrature modulated signal is transmitted as the signal in which the data desired to be transmitted is modulated, and the second signal component orthogonal to the first signal component is transmitted as the training signal. Therefore, it is possible for the receiving side to adjust an equalizer or the like by using the second signal component.

According to the present invention, the signal is received, and the first signal component is adaptively equalized using the training signal. Therefore, it is possible to carry out equalization on the basis of the training signal at all times, and track changes in the characteristics of a communication channel.

According to the present invention, the first signal component of the quadrature modulated signal is transmitted as the signal in which the data desired to be transmitted is modulated, the second signal component orthogonal to the first signal component is transmitted as the training signal, and the first signal component is adaptively equalized using the training signal. Therefore, it is possible for the receiving side to carry out equalization on the basis of the training signal at all times, and track changes in the characteristics of a communication channel.

DETAILED DESCRIPTION

An embodiment of the present invention will hereinafter be described. The present invention uses one component of a quadrature modulated carrier exclusively for transmission of a training signal and uses the other component for transmission of data. A receiver can receive the training signal at all times, and therefore can carry out high-precision adaptive equalization of an equalizer on the basis of the received training signal.

By using a millimeter wave band such as a 60 GHz band as a frequency band, it is possible to secure a very wide usable frequency band. Therefore, even when efficiency is reduced to ½ by using one component of the carrier exclusively for the training signal, a sufficient transmission data rate can be obtained.

Figure 1:
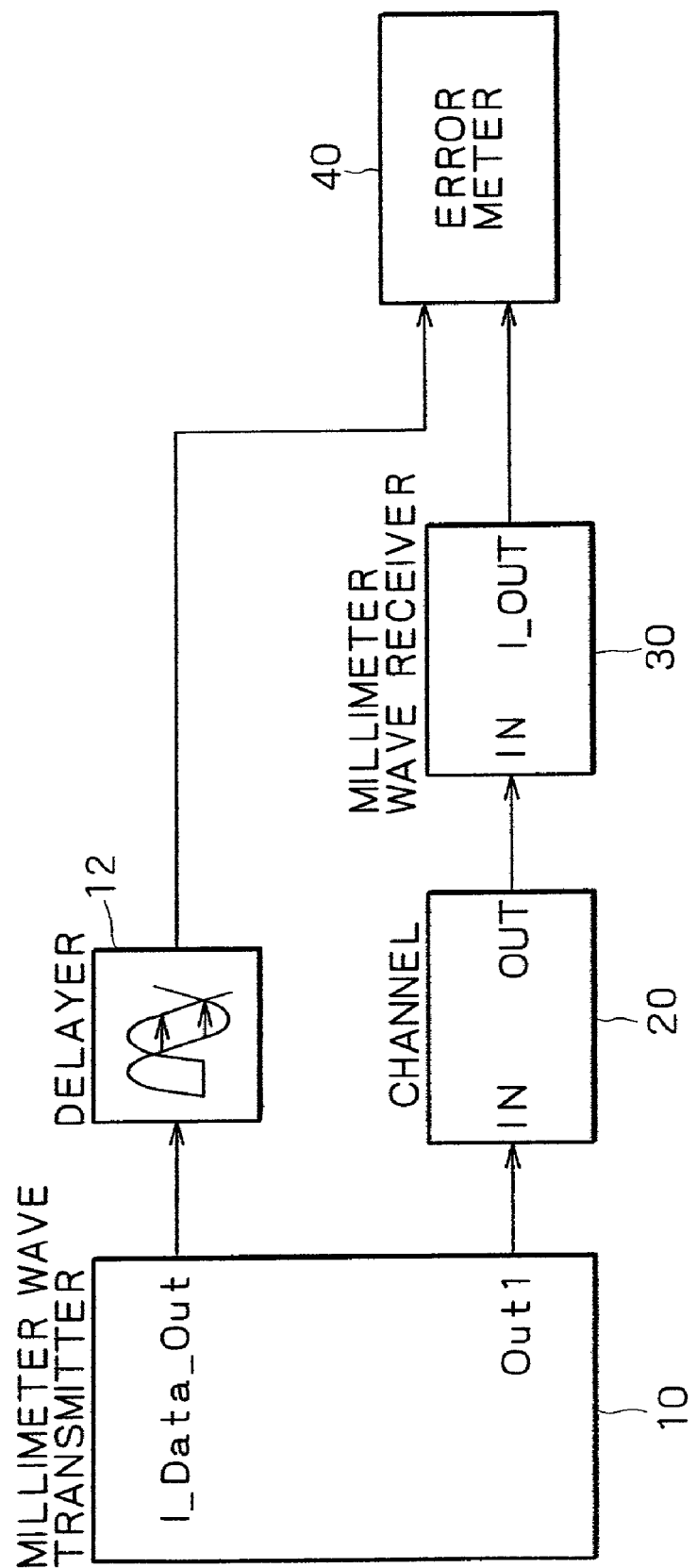
FIG. 1 is a schematic diagram showing the general configuration of a millimeter wave transmitting and receiving system according to the present invention.

FIG. 1 is a schematic diagram showing the general configuration of a millimeter wave transmitting and receiving system according to the present invention. A millimeter wave transmitter 10 is a QPSK modulated signal generator. The millimeter wave transmitter 10 subjects given data to QPSK (Quadrature Phase Shift Keying) modulation, and outputs a QPSK modulated signal from a terminal Out1. The QPSK modulated signal output from the millimeter wave transmitter 10 is input to a terminal In of a channel 20, or a simulator of a communication channel. The channel 20 adds a white noise and a two-wave multipath to the QPSK modulated signal to simulate a real communication channel, and outputs a resulting signal from a terminal Out of the channel 20.

Hereinafter, of a Q component and an I component orthogonal to each other in the quadrature modulated signal, a signal formed by the Q component will be referred to as a Q-ch signal and a signal formed by the I component will be referred to as an I-ch signal. The Q-ch signal is carried by a Q channel (Q-ch), and the I-ch signal is carried by an I channel (I-ch)

The signal output from the channel 20 is input to a terminal In of a millimeter wave receiver 30. The millimeter wave receiver 30 demodulates only the QPSK I component (in-phase component) of the input signal. The demodulated data is output from a terminal I_Out of the millimeter wave receiver 30 to an error meter 40.

In the meantime, the millimeter wave transmitter 10 outputs, from a terminal I_Data_Out, data identical to the data subjected to QPSK modulation and transmitted to the millimeter wave receiver 30 via the channel 20. The data is adjusted in timing by a delayer 12 for a delay time caused by the channel 20 and the millimeter wave receiver 30, and then supplied to the error meter 40.

The error meter 40 compares the data supplied from the millimeter wave receiver 30 with the data supplied from the terminal I_Data_Out of the millimeter wave transmitter 10 via the delayer 12, and thereby measures an error rate.

Figure 2:
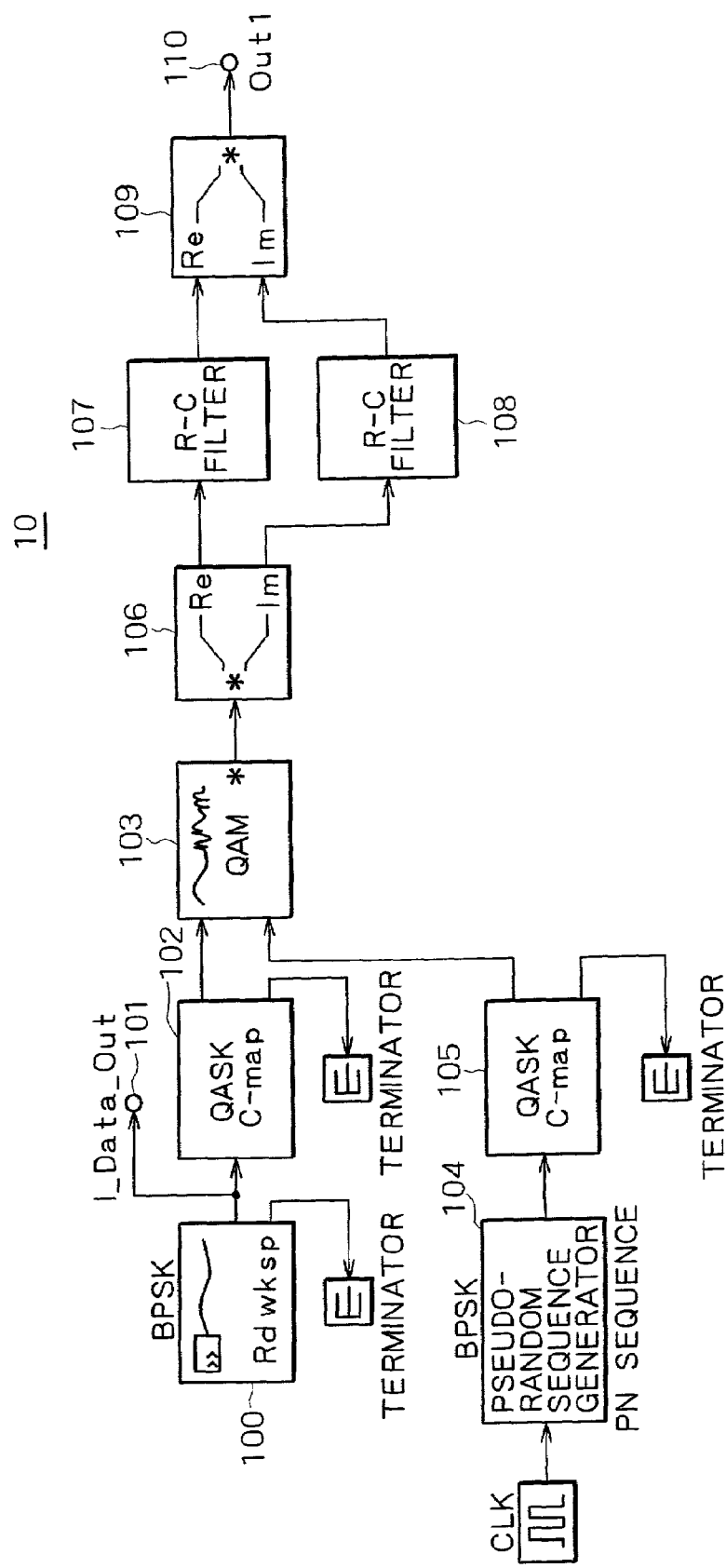
FIG. 2 is a block diagram showing the configuration of a millimeter wave transmitter according to an embodiment of the present invention.

FIG. 2 shows a configuration of the millimeter wave transmitter 10 according to the present embodiment. An Rd wksp circuit 100 generates data desired to be transmitted. The Rd wksp circuit 100 generates the data desired to be transmitted in a predetermined manner on the basis of input data input externally, for example. When the millimeter wave transmitter 10 is used for the purpose of simulation as described above with reference to FIG. 1, the Rd wksp circuit 100 may generate predetermined data in a predetermined manner. The transmission data generated by the Rd wksp circuit 100 is supplied to a QASK C-map (Quadrature Amplitude Shift Keying Circle constellation-Map) circuit 102 to be mapped into a BPSK (Binary Phase Shift Keying) signal, and then the signal is output to one input terminal of a QAM modulation circuit 103.

The data desired to be transmitted generated by the Rd wksp circuit 100 can be output directly from an output terminal I_Data_Out 101. The data output from the output terminal I_Data_Out 101 is supplied to the error meter 40 via the delayer 12, as described above.

In the meantime, a pseudo-random sequence generator circuit 104 generates a PN sequence, which is known data, on the basis of a predetermined clock CLK. The PN sequence is mapped into a BPSK signal by a QASK C-map circuit 105, and then the signal is output to the other input terminal of the QAM circuit 103.

The signals input to the input terminals of the QAM circuit 103 are subjected to QPSK modulation. In this case, the signal obtained by mapping the data desired to be transmitted into the BPSK signal is set as an I component of the QPSK signal, while the signal obtained by mapping the PN sequence into the BPSK signal is set as a Q component of the QPSK signal. Incidentally, it may be said that a BPSK modulated I component and a BPSK modulated Q component form a QPSK modulated wave.

The QPSK modulated signal output from the QAM circuit 103 is supplied to a split circuit 106 to be divided into a real part (Re) and an imaginary part (Im). Signals of the real part and the imaginary part are supplied to a combining circuit 109 via R-C filters (Raised Cosine Filters) 107 and 108, respectively, to be combined into a modulated signal of a complex number. The modulated signal of the complex number output from the combining circuit 109 is output from an output terminal 110.

Thus, since the millimeter wave transmitter 10 according to the present embodiment sets the known PN sequence as the Q component of the QPSK modulated signal, the receiving side can use the Q component as a training signal for the equalizer. This enables estimation of a transfer function of the channel 20, that is, a multipath.

Figure 3:
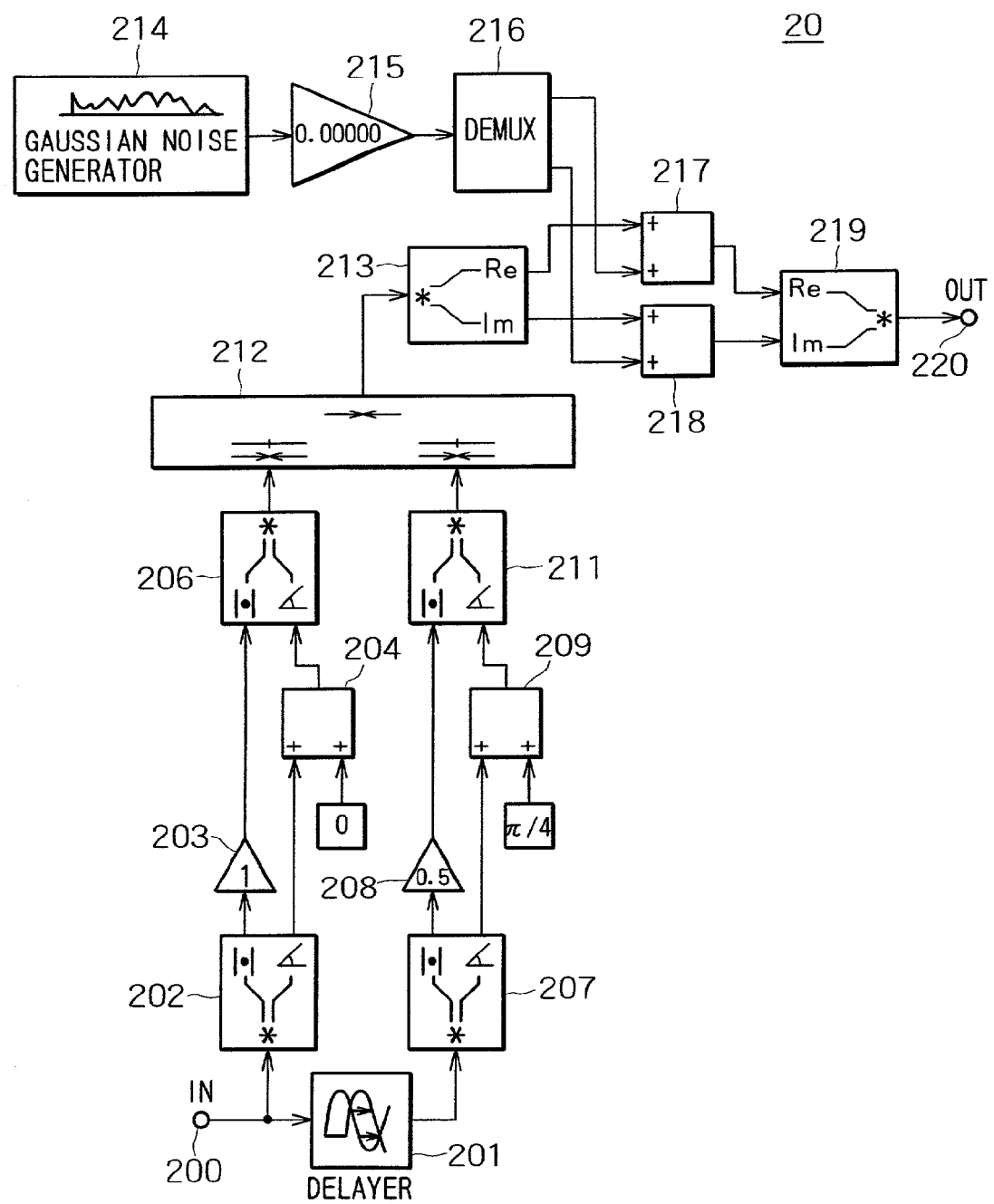
FIG. 3 is a block diagram showing the configuration of a channel.

FIG. 3 shows the configuration of the channel 20. As described above, the channel 20 simulates a multipath channel. The example in FIG. 3 is a model of two paths with a white noise added. It is easy to extend the configuration to be described below to three paths or more.

The QPSK modulated signal output from the millimeter wave transmitter 10 is input to an input terminal 200, and then supplied to a split circuit 202 and to a split circuit 207 via a delay circuit 201. The signal supplied to the split circuit 202 is separated into an amplitude component and a phase component. The amplitude component is output to an amplitude input terminal of a combining circuit 206 via a gain circuit 203 whose amplification factor is set at 1. On the other hand, the phase component is supplied to one input terminal of an adding unit 204, where a constant 0 is added to the phase component, and then output to a phase input terminal of the combining circuit 206. The combining circuit 206 combines the amplitude component and the phase component with each other, and then outputs the result as a complex signal.

In the meantime, the signal input to the delay circuit 201 is output to the split circuit 207 after being delayed by one symbol. The signal supplied to the split circuit 207 is separated into an amplitude component and a phase component. The amplitude component is output to an amplitude input terminal of a combining circuit 211 via a gain circuit 208 whose amplification factor is set at 0.5. On the other hand, the phase component is supplied to one input terminal of an adding unit 209, where a constant $\pi/4$ is added to the phase component, and then output to a phase input terminal of the combining circuit 211. The combining circuit 211 combines the amplitude component and the phase component with each other, and then outputs the result as a complex signal.

The complex signals output from the combining circuits 206 and 211 are each supplied to a complex addition circuit 212 to be added to each other, whereby a two-wave multipath signal is synthesized. The multipath signal output from the complex addition circuit 212 is supplied to a split circuit 213 to be separated into a real part Re and an imaginary part Im. The real part Re and the imaginary part Im output from the split circuit 213 are supplied to a combining circuit 219 via adding circuits 217 and 218, respectively. The real part Re and the imaginary part Im are then combined into one QPSK modulated signal which is output to an output terminal 220. The output is a multipath signal simulating a multipath, which signal is obtained by adding a multipath component to the signal obtained by modulating the data desired to be transmitted.

In the example of FIG. 3, a white noise can also be added to the output signal. A Gaussian noise generator circuit 214 generates a two-dimensional white noise. The white noise is supplied to a demultiplexer 216 via a gain circuit 215 adjusting a noise level, and thereby separated into two one-dimensional white noises. The two white noises are supplied to the adding circuits 217 and 218 to be added to the real part Re and the imaginary part Im, respectively, supplied from the split circuit 213. In this case, the amplification factor of the gain circuit 215 is set at 0, so that no white noise is added to the output signal. Therefore, in simulating the communication channel, attention is directed to only the multipath.

Figure 4:
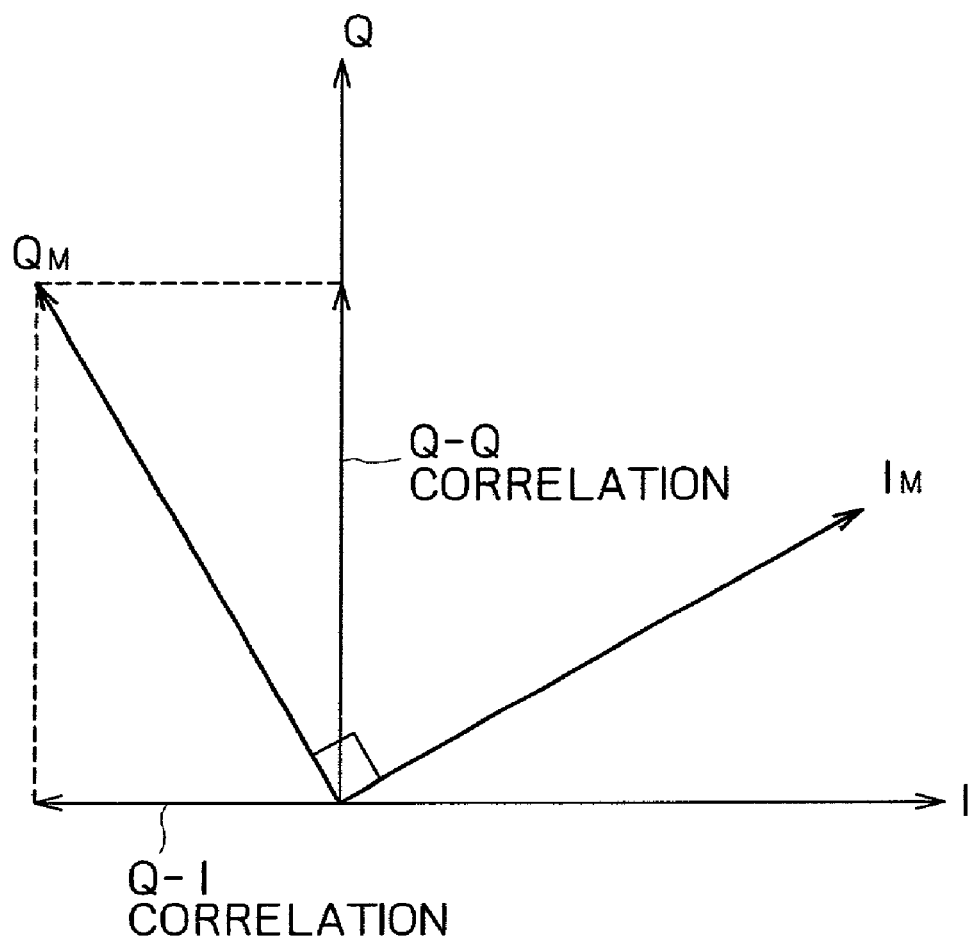
FIG. 4 is a schematic diagram showing an example of signals input to and output from the channel.

FIG. 4 schematically shows an example of signals input to and output from the channel 20. The ordinate axis denotes the Q component, while the abscissa axis denotes the I component. The configuration described above combines the input signal formed by the Q component and the I component with the signal obtained by amplifying the amplitude of the input signal by a factor of 0.5 in the gain circuit 208 and shifting the phase of the input signal by $\pi/4$ in the adding circuit 209. As a result, the input signal formed by the Q component and the I component is converted into a signal formed by a QM component and an IM component obtained by shifting the phase of the original Q component and I component by $\pi/8$ while maintaining an orthogonal relation between the original Q component and I component.

Thus, each of a Q component and an I component in the output signal of the channel 20 has a correlation with the QM component. Hereinafter, the correlation between the QM component and the I component will be referred to as a Q-I correlation, and the correlation between the QM component and the Q component will be referred to as a Q—Q correlation. Hence, interferences of an indirect wave of the multipath of the Q component with I-ch and Q-ch are the Q-I correlation and the Q—Q correlation, respectively.

Figure 5:
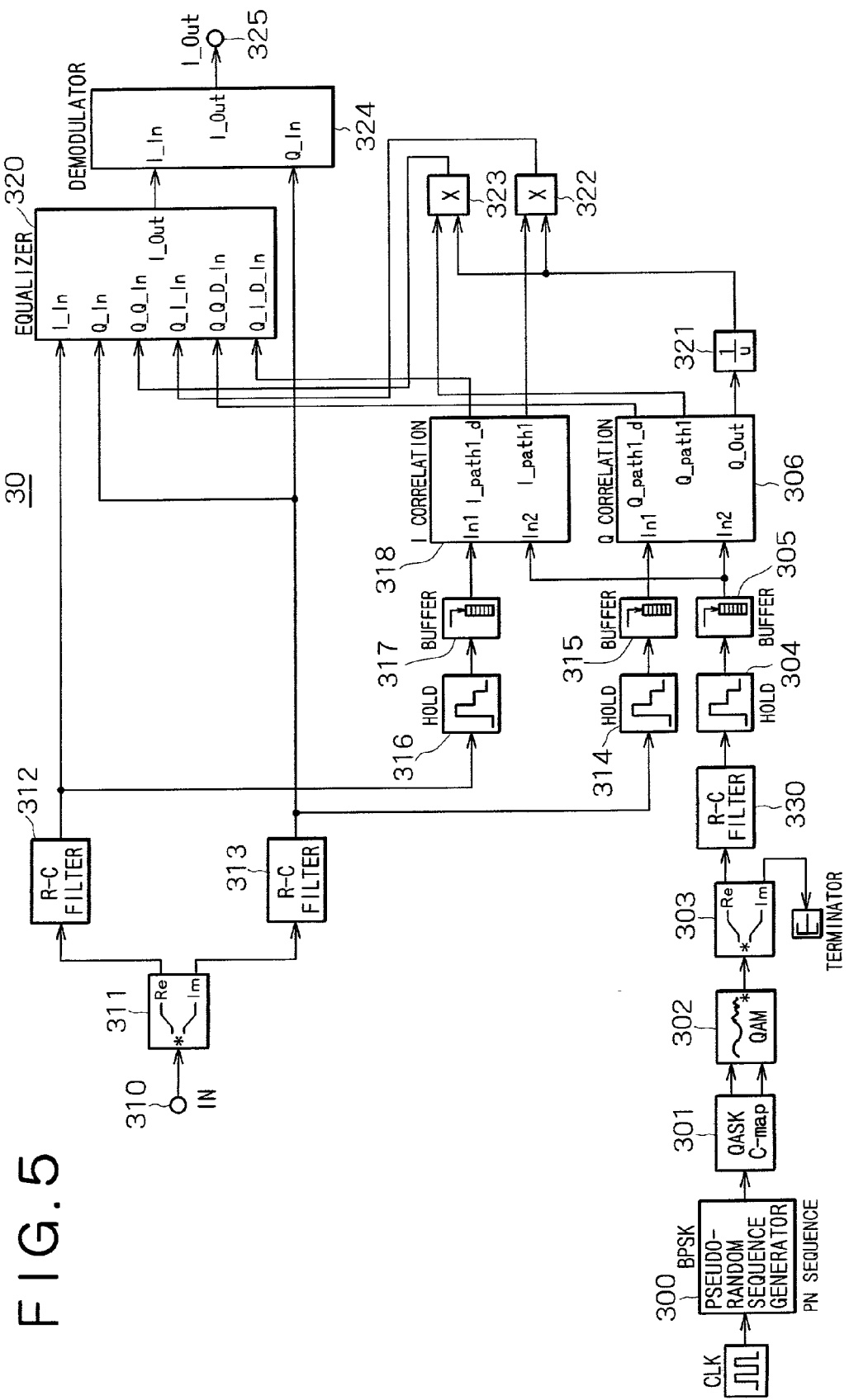
FIG. 5 is a block diagram showing the configuration of a millimeter wave receiver.

FIG. 5 shows the configuration of the millimeter wave receiver 30. A pseudo-random sequence generator circuit 300 within the millimeter wave receiver 30 generates a PN sequence, which is known data, on the basis of a predetermined clock CLK. Specifically, the pseudo-random sequence generator circuit 300 of the millimeter wave receiver 30 generates a pattern identical with the PN sequence generated by the pseudo-random sequence generator circuit 104 in the millimeter wave transmitter 10 described above.

The PN sequence generated by the pseudo-random sequence generator circuit 300 is mapped into a BPSK signal by a QASK C-map circuit 301, subjected to QPSK modulation by a QAM circuit 302, and then input to a split circuit 303. The signal input to the split circuit 303 is separated into a real part Re and an imaginary part Im, and the real part Re is subjected to filter processing by an R-C filter 330. Thereby the Q-ch modulated signal output from the R-C filter 107 in the millimeter wave transmitter 10 described above is reconstructed.

The signal output from the R-C filter 330 is sampled by a zero-order hold circuit 304 to be thereby converted into digital data, and then the digital data is stored in a buffer 305. The buffer 305 in the example of FIG. 5 stores 256 samples. Data read from the buffer 305 is output to an input terminal In2 of a Q correlation circuit 306 and an input terminal In2 of an I correlation circuit 318.

In the meantime, the multipath signal output from the channel 20 is input to an input terminal 310, and then supplied to a split circuit 311 to be separated into a real part Re and an imaginary part Im. The real part Re and the imaginary part Im are supplied to R-C filters 312 and 313, respectively. The real part Re after being subjected to filter processing by the R-C filter 312 is output to an input terminal I_In of an equalizer 320, and also to a zero-order hold circuit 316. The real part Re is sampled by the zero-order hold circuit 316 to be thereby converted into digital data, and then the digital data is stored in a buffer 317, which stores 256 samples. Data read from the buffer 317 is output to an input terminal In1 of the I correlation circuit 318.

Similarly, the imaginary part Im after being subjected to filter processing by the R-C filter 313 is output to an input terminal Q_In of the equalizer 320, and output to an input terminal Q_In of a demodulator 324. The imaginary part Im is also supplied to a zero-order hold circuit 314. The imaginary part Im is sampled by the zero-order hold circuit 314 to be thereby converted into digital data, and then the digital data is stored in a buffer 315, which stores 256 samples. Data read from the buffer 315 is output to an input terminal In1 of the Q correlation circuit 306.

While shifting sampling timing of the data input to the input terminal In1 and the input terminal In2 with respect to each other, the two input terminals In1 and In2 being provided to each of the I correlation circuit 318 and the Q correlation circuit 306, both the I correlation circuit 318 and the Q correlation circuit 306 obtain a correlation value between the data input to the input terminal IN1 and the input terminal In2, as well as the shifted time.

The sampling timing denotes timing in which the zero-order hold circuits 304, 314, and 316 sample a signal. By controlling an address and timing for reading from the buffers 305, 315, and 317 in a given manner, for example, it is possible to shift the sampling timing of the data input to the input terminal In1 of the I correlation circuit 318 and the Q correlation circuit 306 and the sampling timing of the data input to the input terminal In2 of the I correlation circuit 318 and the Q correlation circuit 306 with respect to each other.

As an example, the data stored in the buffer 305 is read and input to the input terminal In2 of the I correlation circuit 318, while the data stored in the buffer 317 is read in shifted sampling timing and input to the input terminal In1 of the I correlation circuit 318. The I correlation circuit 318 compares the data input to the input terminal In1 with the data input to the input terminal In2, and thereby obtains a correlation value between the two pieces of data and the shifted time. This process is sequentially performed on each sample of the data stored in the buffer 317, for example.

As described above, the input signal input to the input terminal 310 has the known PN sequence modulated and output as a Q-ch signal by the millimeter wave transmitter 10 and the multipath component added thereto by the channel 20. Therefore, by obtaining a correlation between the data based on the input signal and the data based on the signal in which the PN sequence generated within the millimeter wave receiver 30, which sequence is identical with that of the millimeter wave transmitter 10, is modulated, it is possible to know a leakage component resulting from the Q-ch signal leaking to I-ch due to the multipath, that is, an I-ch component of the indirect wave of the Q-ch signal.

The I correlation circuit 318 outputs the largest correlation value of the thus obtained correlation values from an output terminal I_path1. The output represents signal level of the indirect wave of the Q-ch signal in I-ch as described above. The I correlation circuit 318 also outputs a shift in the sampling timing when the correlation value is obtained (delay component) from an output terminal I_path1_d. The signal level of the Q-ch signal leaking to I-ch due to the multipath and a delay time can be detected on the basis of the data output from the output terminals I_path1 and I_path1_d, respectively.

In the meantime, the data stored in the buffer 305 is read and output to the input terminal In2 of the Q correlation circuit 306, while the data stored in the buffer 315 is read in shifted sampling timing and output to the input terminal In1 of the Q correlation circuit 306.

The Q correlation circuit 306 compares the data input to the input terminal In1 with the data input to the input terminal In2, and thereby obtains a correlation value of the PN pattern. In this case, the Q correlation circuit 306 obtains the largest correlation value and the second largest correlation value of the correlation values between the two pieces of data. The Q correlation circuit 306 also obtains a difference between the sampling timing in which the largest correlation value is obtained and the sampling timing in which the second largest correlation value is obtained.

Specifically, the input signal input to the input terminal 310 includes a direct wave formed by the Q-ch signal and the indirect wave indicated by the QM component in the Q—Q correlation described above as the Q component. Hence, a signal level at which the Q-ch signal, which is a known signal, is detected by the direct wave in Q-ch is detected as the largest correlation value, and then output from an output terminal Q_out. In addition, a signal level detected by the indirect wave in Q-ch is detected as the second largest correlation value, and then output from an output terminal Q_path1. The difference in the sampling timing is a delay time difference between the direct wave and the indirect wave, and is output from an output terminal Q_path1_d.

In this case, an environment of the multipath from Q-ch to Q-ch may be considered to be the same as an environment of the multipath from I-ch to I-ch. A transfer function of I-ch in the equalizer 320 to be described later is determined by using this relation.

The signal level of the direct wave of the Q-ch signal output from the output terminal Q_out of the Q correlation circuit 306 is converted into 1/u, that is, a reciprocal number by a function (1/u) circuit 321, and then supplied to product circuits 323 and 322.

The level of the indirect wave of the Q-ch signal output from the output terminal Q_path1 of the Q correlation circuit 306 is supplied to the product circuit 323 to be multiplied by a value obtained by converting the signal level of the direct wave of the Q-ch signal into a reciprocal number by the function (1/u) circuit 321. This means that the Q-component level of the indirect wave of the Q-ch signal is divided by the level of the direct wave of the Q-ch signal. Thus, a ratio between the direct wave and the indirect wave in Q-ch is obtained.

Similarly, the level of the indirect wave of the Q-ch signal in I-ch output from the output terminal I_path1 of the I correlation circuit 318 is supplied to the product circuit 322 to be multiplied by the value obtained by converting the signal level of the direct wave of the Q-ch signal into a reciprocal number by the function (1/u) circuit 321. This means that the I component of the indirect wave of the Q-ch signal is divided by the level of the direct wave of the Q-ch signal. Thus, a ratio between the direct wave of the Q-ch signal and the indirect wave of the Q-ch signal in I-ch is obtained.

The output from the output terminal I_path1_d of the I correlation circuit 318 is input to an input terminal Q_I_D_In of the equalizer 320. The output from the output terminal Q_path1_d of the Q correlation circuit 306 is input to an input terminal Q_Q_D_In of the equalizer 320. The output of the product circuit 322 is input to an input terminal Q_I_In of the equalizer 320. The output of the product circuit 323 is input to an input terminal Q_Q_In of the equalizer 320.

Thus, the input terminal Q_I_In and the input terminal Q_I_D_In of the equalizer 320 are supplied with the value and the delay time, respectively, corresponding to the Q-I correlation described with reference to FIG. 4, while the input terminal Q_Q_In and the input terminal Q_Q_D_In of the equalizer 320 are supplied with the value and the delay time, respectively, corresponding to the Q—Q correlation.

The equalizer 320 sets each coefficient of the equalizer 320 on the basis of the data input to the input terminals Q_Q_In, Q_I_In, Q_Q_D_In, and Q_I_D_In. The data related to time and the data related to signal level are input to the input terminals Q_Q_In, Q_I_In, Q_Q_D_In, and Q_I_D_In separately from each other. Therefore, it is possible to readily set each coefficient using an equalizer of a general configuration. In addition, since a reference wave formed by the PN sequence is used, it is possible to determine each coefficient directly.

Furthermore, the transmitting side modulates the PN sequence in Q-ch at all times for transmission. Therefore, even when characteristics of the communication channel are changed with time, the use of the PN sequence included in the received signal enables immediate tracking of the equalizer 320.

As described above, the input terminals I_In and Q_In of the equalizer 320 are supplied with signals obtained by separating the input signal into the real part Re and the imaginary part Im by the split circuit 311 and subjecting the real part Re and the imaginary part Im to filter processing by the R-C filters 312 and 313, respectively. Thus, the input terminals I_In and Q_In are supplied with an in-phase component and a quadrature component, respectively, of the multipath signal. The equalizer 320 equalizes only I-ch on the basis of parameters set as described above.

The I-ch signal equalized by the equalizer 320 is output from an output terminal I_Out and input to an input terminal I_In of the demodulator 324. The demodulator 324 demodulates only the I-ch signal input to the input terminal I_In. The demodulated I-ch signal is output to an output terminal 325 as I-ch data.

Incidentally, since the Q-ch signal is a training signal in which the PN sequence is modulated by the millimeter wave transmitter 10, the Q-ch signal is not necessary for the equalization processing of the equalizer 320 and the demodulation processing of the demodulator 324.

While the above description has been made by taking as an example a case where the training signal is transmitted in Q-ch and data is transmitted in I-ch, the present invention is not limited to this example; the training signal may be transmitted in I-ch and the data may be transmitted in Q-ch.

It is to be noted that while the above description has been made so as to apply the present invention to a wireless LAN, the present invention is also applicable to other systems that carry out communication using radio waves in a millimeter wave band. For example, the present invention is applicable to an ITS (Intelligent Transport System). For example, a communication method according to the present invention is applicable to communication between vehicles in the ITS. In addition, a communication method according to the present invention is applicable to a proposed system in which toll information is exchanged by communication at an automatic tollgate of a toll road or the like so that the toll is paid without stopping the vehicle.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A transmitting apparatus, comprising:
   a training signal generating unit operable to generate a training signal;
   a transmission data generating unit operable to generate data desired to be transmitted;
   a quadrature modulation unit operable to subject a data signal based on the data desired to be transmitted and the training signal to quadrature modulation to form a quadrature modulated signal;
   a first transmitting unit operable to transmit a first signal component of the quadrature modulated signal as a signal in which data desired to be transmitted is modulated; and
   a second transmitting unit operable to transmit a second signal component of the quadrature modulated signal as the training signal, the second signal component being orthogonal to the first signal component, the first signal component being an in-phase signal component, and the second signal component being a quadrature signal component.

2. A transmitting apparatus as claimed in claim 1, wherein the training signal is formed by a known data sequence generated on the basis of a predetermined clock.

3. A transmitting apparatus, comprising:
   a training signal generating unit operable to generate a training signal;
   a transmission data generating unit operable to generate data desired to be transmitted;
   a quadrature modulation unit operable to subject a data signal based on the data desired to be transmitted and the training signal to quadrature modulation to form a quadrature modulated signal;
   a first transmitting unit operable to transmit a first signal component of the quadrature modulated signal as a signal in which data desired to be transmitted is modulated; and
   a second transmitting unit operable to transmit a second signal component of the quadrature modulated signal as the training signal, the second signal component being orthogonal to the first signal component, the first signal component being a quadrature signal component, and the second signal component being an in-phase signal component.

4. A signal transmitting method, comprising the steps of:
   generating a training signal;
   generating data desired to be transmitted;
   subjecting a data signal based on the data desired to be transmitted and the training signal to quadrature modulation to form a quadrature modulated signal;
   transmitting a first signal component of the quadrature modulated signal as a signal in which data desired to be transmitted is modulated; and
   transmitting a second signal component of the quadrature modulated signal orthogonal to the first signal component as the training signal, the first signal component being an in-phase signal component, and the second signal component being a quadrature signal component.

5. A receiving apparatus, comprising:
a receiving unit operable to receive a signal including first and second signal components of a quadrature modulated signal, the first signal component including a signal in which data desired to be transmitted is modulated, and the second signal component being orthogonal to the first signal component and being transmitted as a training signal, the first signal component being an in-phase signal component, and the second signal component being a quadrature signal component;
a generating unit to generate the training signal at the receiving unit;
a processing unit to process the receiver-generated training signal, thereby generating a processed signal;
a first correlation circuit to correlate the first component of the received signal with a component of the processed signal;
a second correlation circuit to correlate the second component of the received signal with the component of the processed signal; and
an equalizer operative to adaptively equalize the first signal component according to the output of the first and second correlation circuits.

6. A receiving apparatus as claimed in claim 5, wherein the training signal is formed by a known data sequence.

7. A receiving apparatus, comprising:
a receiving unit operable to receive a signal including first and second signal components of a quadrature modulated signal, the first signal component including a signal in which data desired to be transmitted is modulated, and the second signal component being orthogonal to the first signal component and being transmitted as a training signal, the first signal component being a quadrature signal component, and the second signal component being an in-phase signal component;
a generating unit to generate the training signal at the receiving unit;
a processing unit to process the receiver-generated training signal, thereby generating a processed signal;
a first correlation circuit to correlate the first component of the received signal with a component of the processed signal;
a second correlation circuit to correlate the second component of the received signal with the component of the processed signal; and
an equalizer operative to adaptively equalize the first signal component using the output of the first and second correlation circuits.

8. A receiving apparatus, comprising:
a receiving unit operable to receive a transmission signal including first and second signal components of a quadrature modulated signal, the first signal component including a signal in which data desired to be transmitted is modulated, and the second signal component being orthogonal to the first signal component and being transmitted as a training signal;
a signal separator operable to separate the transmission signal into a third signal component corresponding to the first signal component and a fourth signal component orthogonal to the third signal component and corresponding to the second signal component;
an equalizer operable to equalize the third signal component;
a signal generator operable to generate a known signal identical to the training signal; and
a correlation unit operable to use the third signal component, the fourth signal component and the known signal to obtain a ratio between a level of the second signal component included in the third signal component and a level of the second signal component formed by a direct wave included in the fourth signal component, a ratio between a level of the second signal component formed by an indirect wave included in the fourth signal component and the level of the second signal component formed by the direct wave included in the fourth signal component, a time difference between the second signal component included in the third signal component and the known signal, and a time difference between the second signal component formed by said direct wave included in the fourth signal component and the second signal component formed by the indirect wave included in the fourth signal component;
whereby equalizing characteristics of the equalizer are adjusted on the basis of results obtained by the correlation unit.

9. A signal receiving method, comprising the steps of:
receiving a signal including first and second signal components of a quadrature modulated signal, the first signal component including a signal in which data desired to be transmitted is modulated, and the second signal component being orthogonal to the first signal component and being transmitted as a training signal, the first signal component being an in-phase signal component, and the second signal component being a quadrature signal component;
generating the training signal at a receiving unit;
processing the receiver-generated training signal to generate a processed signal;
correlating the first component of the received signal with a component of the processed signal;
correlating the second component of the received signal with the component of the processed signal; and
adaptively equalizing the first signal component using the results of said correlating steps.

10. A transmitting and receiving apparatus for transmitting and receiving a signal modulated by quadrature modulation, the transmitting and receiving apparatus comprising:
a training signal generating unit operable to generate a training signal;
a transmission data generating unit operable to generate data desired to be transmitted;
a quadrature modulation unit operable to subject a data signal based on the data desired to be transmitted and the training signal to quadrature modulation to form a quadrature modulated signal;
a transmitting unit operable to transmit a transmission signal including a first signal component of the quadrature modulated signal as a signal in which data desired to be transmitted is modulated, and a second signal component of said the quadrature modulated signal as the training signal, the second signal component being orthogonal to the first signal component, the first signal component being an in-phase signal component, and the second signal component being a quadrature signal component; and
a receiving unit operable to receive the transmission signal and to adaptively equalize the first signal component using the training signal.

11. A transmitting and receiving apparatus as claimed in claim 10, wherein he training signal is formed by a known data sequence.

12. A transmitting and receiving apparatus for transmitting and receiving a signal modulated by quadrature modulation, the transmitting and receiving apparatus comprising:

a training signal generating unit operable to generate a training signal;

a transmission data generating unit operable to generate data desired to be transmitted;

a quadrature modulation unit operable to subject a data signal based on the data desired to be transmitted and the training signal to quadrature modulation to form a quadrature modulated signal;

a transmitting unit operable to transmit a transmission signal including a first signal component of the quadrature modulated signal as a signal in which data desired to be transmitted is modulated, and a second signal component of the quadrature modulated signal as the training signal, the second signal component being orthogonal to the first signal component, the first signal component being a quadrature signal component, and the second signal component being an in-phase signal component; and a receiving unit operable to receive the transmission signal and to adaptively equalize the first signal component using the training signal.

13. A transmitting and receiving apparatus for transmitting and receiving a signal modulated by quadrature modulation, the transmitting and receiving apparatus comprising:

a transmitting unit operable to transmit a transmission signal including a first signal component of a quadrature modulated signal as a signal in which data desired to be transmitted is modulated, and a second signal component of the quadrature modulated signal as a training signal, the second signal component being orthogonal to the first signal component; and a receiving unit operable to receive the transmission signal and to adaptively equalize the first signal component using the training signal, wherein the transmitting unit includes:

a training signal generating unit operable to generate the training signal;

a transmission data generating unit operable to generate the data desired to be transmitted;

a quadrature modulation unit operable to subject a data signal based on the data desired to be transmitted and the training signal to quadrature modulation to form the quadrature modulated signal; and a transmitter operable to transmit the quadrature modulated signal, the receiving unit includes:

a signal separator operable to separate the transmission signal into a third signal component corresponding to the first signal component and a fourth signal component orthogonal to the third signal component and corresponding to the second signal component;

an equalizer operable to equalize the third signal component;

a signal generator operable to generate a known signal identical to the training signal; and a correlation unit operable to use the third signal component, the fourth signal component and the known signal to obtain a ratio between a level of the second signal component included in the third signal component and a level of the second signal component formed by a direct wave included in the fourth signal component, a ratio between a level of the second signal component formed by an indirect wave included in the fourth signal component and the level of the second signal component formed by the direct wave included in the fourth signal component, a time difference between the second signal component included in the third signal component and the known signal, and a time difference between the second signal component formed by the direct wave included in the fourth signal component and the second signal component formed by the indirect wave included in the fourth signal component;

whereby equalizing characteristics of the equalizer are adjusted on the basis of results obtained by the correlation unit.

14. A method for transmitting and receiving a signal modulated by quadrature modulation, the method comprising the steps of:

generating a training signal;

generating data desired to be transmitted;

subjecting a data signal based on the data desired to be transmitted and the training signal to quadrature modulation to form a quadrature modulated signal;

transmitting a transmission signal including a first signal component of the quadrature modulated signal as a signal in which data desired to be transmitted is modulated and a second signal component of the quadrature modulated signal orthogonal to the first signal component as the training signal, the first signal component being an in-phase signal component, and the second signal component being a quadrature signal component; and receiving the transmission signal and adaptively equalizing the first signal component using the training signal.

* * * * *

UNITED STATES PATENT AND TRADEMARK OFFICE
CERTIFICATE OF CORRECTION

| | |
|---|---|
| PATENT NO. | : 7,254,181 B2 |
| APPLICATION NO. | : 10/067384 |
| DATED | : August 7, 2007 |
| INVENTOR(S) | : Isao Takeuchi |

It is certified that error appears in the above-identified patent and that said Letters Patent is hereby corrected as shown below:

Column 12, line 63, "wherein he training" should read -- wherein the training --.

Signed and Sealed this

Twenty-ninth Day of July, 2008

JON W. DUDAS
*Director of the United States Patent and Trademark Office*